United States Patent Office 3,522,934
Patented Aug. 4, 1970

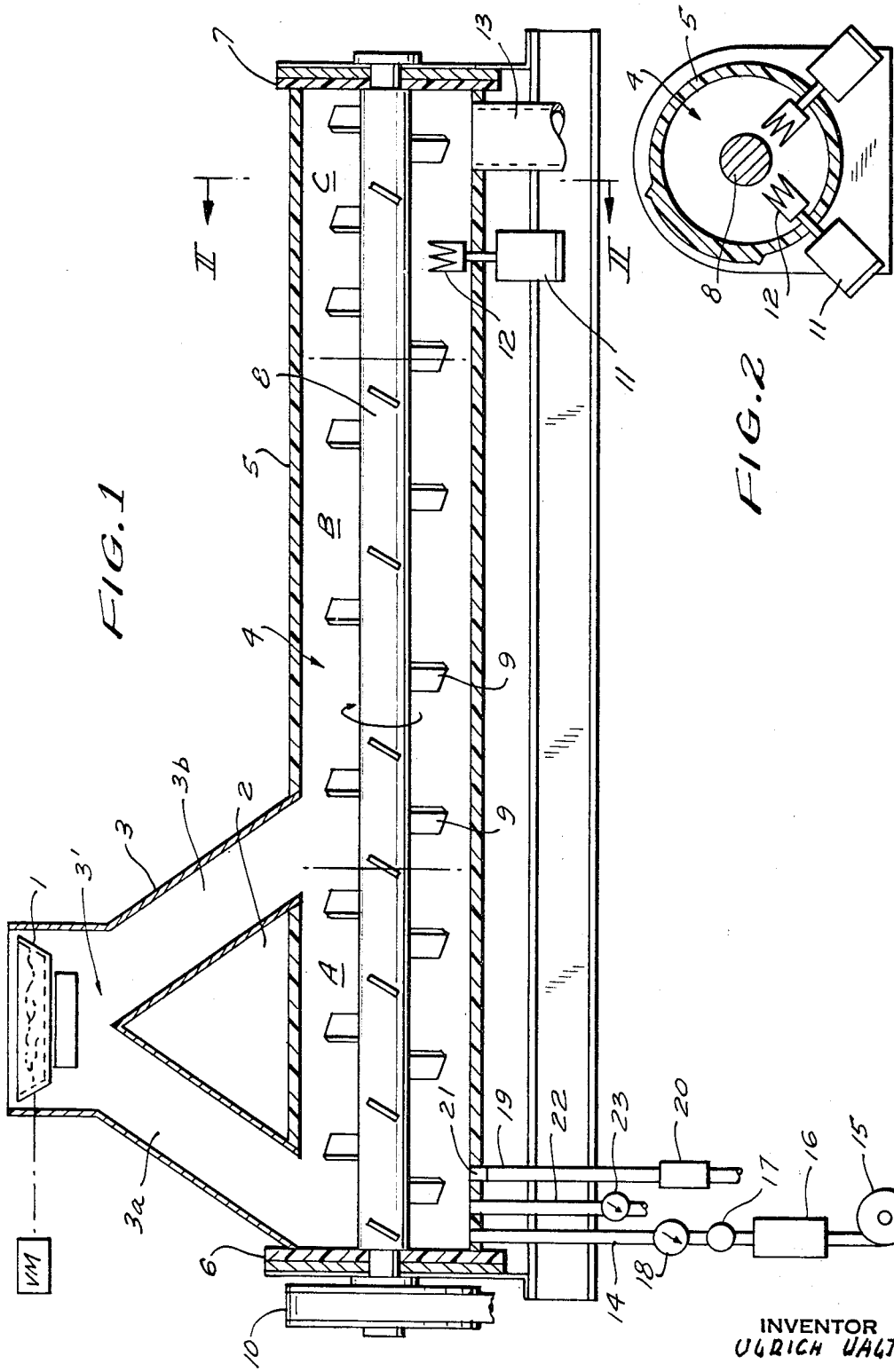

3,522,934
METHOD AND APPARATUS FOR PRODUCING A HOMOGENEOUS MIXTURE OF GRANULAR AND VISCOUS SUBSTANCES
Ulrich Walter, Asternweg 17, Metzkausen, Germany
Filed Aug. 8, 1968, Ser. No. 751,143
Int. Cl. B01f 7/02
U.S. Cl. 259—9                                29 Claims

ABSTRACT OF THE DISCLOSURE

A method and apparatus for producing a homogeneous mixture of granular and viscous substances. A viscous fraction is continuously admixed with a portion of a dry granular fraction to thereby obtain a moist granular intermediate mixture. This moist intermediate mixture has thereupon continuously admitted thereinto the remainder of the dry granular fraction, and the two are continuously admixed to thereby adhere the granules of the remainder of the dry granular fraction to the granules of the moist intermediate mixture and obtain a flowable dry granular final mixture.

BACKGROUND OF THE INVENTION

The present invention relates generally to the admixing of substances, and more particularly to the continuous production of a homogeneous mixture of granular and viscous substances. The invention relates, still more specifically, to a method of producing a homogeneous mixture of granular and viscous substances, and to an apparatus for carrying out the method.

There are many applications where it is necessary to produce a homogeneous mixture from granular and viscous substances. The granular substances to undergo admixture in this manner may include processed wheat flour, potato flour, starch flour, milk powder, cocoa powder, mineral substances and the like. The term granular substance in these applications, and as utilized hereafter in the specification and the claims, designates pulverulent as well as particulate substances, and the term viscous substance refers to a wide range of flowable materials whose consistency may vary from aqueous and therefore a state of low viscosity to substances having a state of very high viscosity. Such substances, to be admixed with the granular substances enumerated above, may include, depending of course upon the end product which it is desired to obtain, such relatively low-viscosity substances as liquid or liquefied vegetable and/or animal fats, vegetable and/or animal oils, or fish solubles. High-viscosity substances include lecithin, molasses, honey or the like.

In all such applications the admixture of granular and viscous substances must not only be absolutely homogeneous, but the final product must be completely free of agglomerations such as lumps, and it must be in flowable condition. The problem which has been encountered in the prior-art approaches has primarily been the very high power requirements needed for operation of mixing devices employed in the admixture of these substances. This results from the fact that conventionally the granular and viscous substances are added into a mixing chamber wherein they are admixed by rotation of a shaft provided with projecting blades which cooperate with the stationary friction blades located in the mixing chamber. In this type of approach the substances to be mixed are fed under pressure through a throttled opening and against the friction blades with which the rotary blades cooperate. The particles of granular substances which are coated with the more or less viscous substances adhere to one another and to the walls of the mixing chamber, and this results in a grinding action causing the granular substance to be ground into powder form. For various reasons well known to those active in this field, this is highly undesirable, for instance where granular animal feed is to be admixed in this manner with molasses, an exemplary situation which will be used hereafter to explain the present method and apparatus by way of example. In the admixture of these substances the presence of pulverulent material in the final product, that is in the mixed animal feed consisting of the admixed granular and viscous substances, is objectionable because such pulverulent materials are not as readily digested by the animal organism.

It is thus a general object of the present invention to provide a method which is not subject to these disadvantages.

A more particular object of the present invention is to provide a method for producing a homogeneous mixture of granular and viscous substances wherein the final product is a dry granular mixture in flowable state containing no pulverulent matter.

An additional object of the invention is to provide such a method which requires less energy expenditure than heretofore known.

A concomitant object of the invention is to provide an apparatus for carrying out the method.

SUMMARY OF THE INVENTION

In pursuance of the above objects, and others which will become apparent hereafter, one feature of my invention resides in the provision of a method for producing a homogeneous mixture of granular and viscous substances. In pursuance of this feature I continuously admix a viscous fraction with a portion of a dry granular fraction to thereby obtain a moist granular intermediate mixture. Into this intermdeiate mixture I continuously admix the remainder of the dry granular fraction and I thereafter continuously admix the remainder and the moist inermediate mixture to thereby adhere the granules of the remainder to the granules of the moist intermediate mixture and obtain a flowable dry granular final mixture.

Advantageously, I supply the dry granular fraction in form of a veil or curtain which prior to contact with the viscous fraction is subdivided into two portions, only one of which is allowed to contact the viscous fraction for admixture therewith to thereby obtain the moist granular intermediate mixture. The other portion of the dry granular fraction is continuously admitted into the thus-obtained moist intermediate mixture which is caused to advance in a predetermined path, and such admission takes place downstream of the location where the first portion of the dry granular fraction is admixed with the viscous fraction to obtain the moist intermediate mixture. In this manner I in effect coat the moist granules of the remainder of the granular fraction and thus obtain a dry homogeneous final product which is completely free of agglomerations and which is readily flowable.

As a result of the fact that initial admixture takes place between only a portion of the dry granular fraction, and the totality of the viscous fraction, the energy expediture necessary for carrying out such admixture is considerably lower than heretofore possible, this being occasioned by the fact that upon admitting the remainder of the dry granular fraction into the moist intermediate mixture the total quantity of granular and viscous substances which are now being admixed is dry enough so that no or at most only insignificant adhesion and agglomeration among the granules of the mixture of the one hand, and among the granules and the walls of the mixing vessel on the other hand, take place.

Advantageously, I will subject the final mixture to an additional mixing step, and I may advance the intermediate mixture, and the final mixture while the same undergoes the additional mixing step, at a rate of speed which is different from the rate of speed at which the intermediate mixture with the remainder of the dry granular fraction are advanced. Such speed differentials may be selected within a wide range of possibilities, and this makes it possible for me to obtain any desired intensity of admixture in the preliminary mixing zone in which the viscous fraction is admixed with the first portion of the dry granular fraction, and in the final mixing zone in which the final mixture is subjected to a final mixing step.

To further reduce the possibility that there might develop adhesion between the substances to be admixed and the wall bounding the mixing chamber as well as with the mixing instrumentalities, a problem which is very prevalent in the prior art and gives rise to malfunctioning of mixing apparatus and to considerably increased power requirements, I may make the mixing vessel in which I carry out my process from a synthetic plastic material, particularly polyvinylchloride. Alternately I may of course instead choose to only coat the inner surfaces bounding the mixing chamber, and the same considerations apply naturally to the mixing instrumentalities as well as, broadly speaking, to any and all components of my apparatus, or exposed surfaces of such components, with which the substances to be admixed come into contact.

In certain applications it is desired not only to assure that the final mixture be completely free of agglomerations, but also that it be of particularly fined and unvarying granular consistency. This is, for example, desired in the case of chicken feed. In such cases I may, in accordance with a further feature of my invention, provide two or more rotating cutter knives in the final admixing zone which are arranged to rotate about axes normal to the axis of rotation of the main admixing instrumentality. These cutter knives may be driven for rotation in mutually opposite directions.

Precise dosing or metering of the granular fraction is advantageously accomplished by providing a vibratory inlet conduit which may be provided with means for varying the frequency and/or amplitude of vibrations to thereby permit precise control. As far as the viscous fraction is concerned it may be desirable to utilize simultaneously, successively or alternatively various substances having different viscosity. To make this possible I may provide several inlets for the viscous fraction so that a viscous substance of differing viscosity may be independently admitted through each of these inlets. If the viscous fraction includes a viscous substance of aqueous character it may be advantageous to supply it into the mixing chamber in atomized form. To make this possible I may provide the inlet for the viscous fraction, or the inlet for that viscous substance of the viscous fraction which is of aqueous character, with an atomizer nozzle having a given scatter angle of for instance 60°, and this nozzle may be exchangeable for others.

Particularly viscous substances may be admitted through a conduit having interposed therein a filter which advantageously consists of bronze and is provided with a filter insert, and a rotary pump having a rotor and a follower each of which consists of bronze may be supplied in the conduit for advancing the viscous substance therethrough. The reason for utilizing bronze is the desire to prevent to the maximum extent possible any undesirable adhesion of material to the components in question. To make it possible to regulate and supervise the quantities of highly viscous substance which are admitted, I may with advantage provide a ball valve in the inlet conduit and a volume counter which may particularly be of the double-indicator type and which may be provided with a zero-setting device and with a rotary counter for continuous summation of the admitted quantities.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a vertical longitudinal cross-section in somewhat diagrammatic form through an apparatus according to my invention; and FIG. 2 is a section taken on the line II—II of FIG. 1.

DESCRIPTION OF THE PREFERRED EMBODIMENTS

Discussing now the drawing in detail, and firstly FIG. 1 thereof, it will be seen that my novel mixing apparatus comprises a substantially cylindrical vessel 5 consisting advantageously of synthetic plastic material, such as polyvinylchloride, and arranged horizontally. The vessel 5 defines in its interior a mixing chamber 4. Its left-hand open end is closed by an end wall or closure plate 6 and its right-hand open end is closed by an end wall or closure plate 7, both consisting of the same material as the circumferential wall of the vessel 5.

FIG. 1 clearly shows that the vessel 5 is provided in its circumferential wall with an opening (not designated with a reference numeral) with which there communicates an inlet conduit 3. Located in the inlet conduit 3, the hollow interior of which is designated with reference numeral 3', is a distributing means in form of a member 2 which in the illustrated embodiment is of substantially triangular cross-sectional configuration. Generally speaking the member 2 may be said to be of gable-roof configuration, and its two mutually inclined outer lateral surfaces face the associated side walls of the conduit 3 and thus subdivide the interior 3' thereof into two channels 3a and 3b, respectively. A vibratory feed channel 1 of known construction communicates with the interior 3' of the conduit 3 upwardly of the member 2. In known manner the feed channel 1 may be provided with varying means VM, illustrated diagrammatically in FIG. 1 because it is already known, which when actuated will serve to vary the vibratory frequency and/or the vibratory amplitude of the channel 1. The channel 1 supplies a granular fraction, that is a particulate or pulverulent material, in form of a veil or curtain discharged from the channel 1. Other suitable control devices, such as a quantity-regulating slide member or the like (not illustrated) may also be provided for further regulating the quantity of granular fraction discharged by the channel 1.

The granular fraction is discharged over the front edge of the channel 1 and descends in form of a curtain or veil, as already pointed out. This curtain or veil is subdivided by the member 2 so that a first portion of the discharged dry granular fraction enters the channel 3a whereas a second portion enters the channel 3b.

As illustrated in the drawing, the channel 3a communicates with the mixing chamber 4 in the left-hand end thereof, whereas the channel 3b communicates with the mixing chamber 4 at a location longitudinally spaced from the left-hand end, as shown. The interior of the mixing chamber 4 may be assumed to be subdivided into three mixing zones A, B and C. There is no subdivision by wall means or the like, but it will be noted that the rotary mixing instrumentality consisting of the shaft 8, mounted for rotation in bearings supported by the plates 6 and 7 and carrying the radially projecting mixing blades 9, has the mixing blades 9 mounted thereon at different longitudinal spacing and/or at different angles of inclination with reference to its longitudinal axis in the three different mixing zones A, B and C. Specifically, the mixing zone A is assumed to extend from the left-hand end of the mixing chamber 4 to the beginning of the inlet aperture through which the channel 3b communicates with chamber 4. The mixing zone B is assumed to extend from the end of the mixing zone A towards the right-hand end of the chamber 4 and is followed by the mixing zone C. In the mixing zone A, the blades 9 are spaced closer, as seen in longitudinal direction of the shaft member 8, than they are spaced in the mixing zone B. In the zone C, however, the blades are again spaced closer than in the zone B. Also, and this may be in addition to the changes in spacing or independently thereof, the angular inclination of the blades 9 with reference to the longitudinal axis of the shaft member 8 varies from zone to zone. Specifically, in zone A the angular inclination is different from the one shown in zone B. A belt pulley 10 mounted on the shaft member 8 serves to transmit rotary motion to the same in the sense indicated by the curved arrow associated with the shaft member 8.

In the illustrated embodiment I have provided in the zone C two rotary cutters 12 which are located in the interior of the chamber 4 upstream of the outlet 13 which communicates with the chamber 4 for discharge of the final product therefrom. These cutters 12 each rotate about axes which are normal to the axis of rotation of the shaft member 8 (compare FIG. 2), and they are each driven by an independent drive means, for instance a diagrammatically illustrated electromotor 11. Of course, I may provide more than two of the cutters 12 and advantageously they may rotate in mutually opposite directions. It will be noted that the cutters 12 are provided with cutter edges which, as clearly shown in FIGS. 1 and 2, are so arranged with reference to one another as to resemble the outline of a crown and to extend in substantial parallelism with the axis of rotation of the respective cutter member 12. The cutter members 12 may, of course, be omitted.

FIG. 1 shows three inlets in form of inlet conduits 14, 19 and 22 for viscous substances. These inlets 14, 19 and 22 communicate with the mixing chamber 4 in the mixing zone A, and more specifically in the same region of the zone A in which the channel 3a communicates therewith. They are provided to make it possible to admit substances of different viscosity simultaneously, successively or alternatively. While the drawing shows them to communicate with the chamber 4 from below, it should be understood that this is done for purposes of clarity and that actually it is preferred to have the inlet conduits 14, 19 and 22 communicate with the mixing chamber 4 from the side or from the top thereof.

In the embodiment illustrated it is assumed that the inlet conduit 14 will serve to introduce a high-viscosity substance, such as molasses or the like. This inlet conduit 14 has interposed therein a pump 15, for example a rotary pump whose rotor and follower advantageously consist of bronze for the reasons set forth above. The pump 15 is provided with a spill valve (not shown) which serves to return excess viscous substance into circulation. Arranged downstream of the pump 15, also interposed in the conduit 14, is a sieve-type filter 16 which also consists advantageously of bronze. A ball valve 17 is also interposed in the conduit 14 downstream of the filter 16, as is a volume counter 18 which serves to indicate the volume of viscous substances passing through the conduit 14 into the chamber 4. Advantageously the volume counter 18 is provided with a double-indicator device, with a control indicator, with a zero-setting device and with a rotary counter for providing a summary of the admitted quantity of viscous substance. Details of the elements 15, 16, 17 and 18 are not illustrated because they are all well known in the art and do not in themselves constitute a part of the invention, except for the utilization of bronze in the elements 15 and 16.

Conduit 19 is assumed to serve for admitting into the chamber 4 a substance which has considerably less viscosity, and which is for example of aqueous consistency. This conduit 19 is provided with an interposed flow meter 20 with a conical float, such a flow meter already being known in the art. An atomizing nozzle 21 is associated with the conduit 19 where the same communicates with the zone A of the mixing chamber 4, and advantageously this nozzle 21 may be interchangeable for others. The nozzle 21 may have a scatter angle of any desired extent, for example on the order of 60°. Finally the inlet conduit 22, which is also provided with a quantity-indicating device 23 of known construction, serves to admit a viscous substance which is not to be atomized on introduction into the mixing chamber 4 and whose viscosity may differ from that of the substances admitted through the conduits 14 and 19, respectively.

Operation of my novel apparatus will be clear from what has been set forth above. Granular material discharged by the channel 1 is subdivided by the member 2 as already pointed out earlier, so that a portion enters the channel 3a. From there it enters the admixing zone A to be admixed therein with the viscous fraction discharged through one, two or all of the conduits 14, 19 and 22, such admixing taking place by the rotating blades 9 carried on the shaft member 8 in the admixing zone A. Advantageously my machine will be so constructed that the channel 1 will not discharge the granular material until the shaft member 8 has begun to rotate. Furthermore, it is advantageous to provide at the inlet of the apparatus a flow-indicator device, which may consist of a mercury switch including a housing and an adjustable counter 8, which will serve to interrupt the admission of viscous substance in the event the supply of granular substance should be terminated or accidentally interrupted. Devices of this type, and the manner in which they will be associated with the various components of the apparatus, are already known and do not constitute a part of the invention. Therefore this device, namely the flow indicator, has not been illustrated and is not further described.

The first portion of granular substance admitted into the zone A through the channel 3a is admixed therein with the viscous substance, thus forming with the same a moist granular intermediate mixture which is advanced in the direction towards the right-hand end of the chamber 4 by the fact that the blades 9 are inclined as illustrated. As this intermediate mixture passes below the outlet end of the channel 3b, the remainder of the dry granular fraction is continuously admitted into it and becomes admixed therewith in the admixing zone B. What takes place in the zone B is an adhesion of the dry granules of the remainder of the granular substance or fraction entering through the channel 3b with the granules of the intermediate moist mixture. This results in an absolutely homogeneous final mixture the individual granules, or rather composite granules each of which of course consist of two or more granules which are adhered by the viscous fraction, are exteriorly dry and therefore flowable. During admixture in the zone B, the final mixture of course continues to advance towards the right-hand end of the chamber 4 until it enters the zone C wherein it continues to advance towards the outlet 13, while undergoing further admixture by the blades 9 and while also being subjected to the action of the rotary cutters 12. These cutters serve to separate any agglomeration and the product is once more subjected to homogenizing mixing action by the blades 9 located downstream of the cutters 12, before it can leave through the outlet 13.

As already indicated earlier, it is desired that there be sufficient intensity of admixture in the zone A, and for this reason the blades 9 in this zone are closer spaced than in the zone B. They may also have different angular inclination with respect to the axis of rotation of the shaft member 8. In fact, to allow a variation of the dwell time, that is the time for which the preliminary mixture will remain in the zone A and for which the final mixture will remain in the zone B and thereupon in the zone C, the shaft member 8 may be provided with a plurality of insertion apertures or the like, and these insertion apertures insofar as they are not being used at any given time may be closed with a suitable plug or the like. This makes it possible to position the blades 9 along the member 8 as desired for a given application. It has also been mentioned earlier that the shaft member 8 may be coated with synthetic plastic material to reduce adhesion problems. The final mixture is of course intended to remain in the zone B longer than the preliminary intermediate mixture in the zone A. For this reason the blades 9 are spaced further apart in the zone B than in the zone 9.

The viscous fraction admitted into the zone A, for instance molasses admitted through the inlet conduit 14, is supplied in a continuous uniform stream which is exactly metered. The supply of viscous fraction can begin only when granular substance is being admitted into the chamber 4, and not before. How this is accomplished is well known in the art and constitutes no part of the invention. The purpose of this provision is to assure that viscous substance or substances cannot enter the chamber 4 in the absence of granular substance because the resulting fouling problems, and also to assure that granular material cannot pass through the mixing chamber without becoming admixed with viscous material. Of course, additional more or less viscous substances may be admitted through the conduits 19 and/or 22 simultaneously with the admission of such material through the conduit 14, or prior to or subsequent to such admission.

It will be understood that each of the elements described above, or two or more together, may also find a useful application in other types of constructions differing from the types described above.

While the invention has been illustrated and described as embodied in an apparatus for producing a homogeneous mixture of granular and viscous substances, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of producing a homogeneous mixture of granular and viscous substances, comprising the steps of continuously admixing a viscous fraction with a portion of a dry granular fraction to thereby obtain a moist granular intermediate mixture; continuously admitting the remainder of the dry granular fraction into the thus-obtained moist intermediate mixture; and continuously admixing the remainder and the moist intermediate mixture to thereby adhere the granules of the remainder to the granules of the moist intermediate mixture and obtain a flowable dry granular final mixture.

2. A method as defined in claim 1; and further comprising the step of subjecting the final mixture to additional mixing.

3. A method as defined in claim 2, said intermediate mixture being advanced in a predetermined direction through a first mixing zone and into a second mixing zone, and said final mixture being obtained in said second mixing zone and being advanced in said predetermined direction into and through a third mixing zone; and wherein said mixtures are being advanced at different speeds at least in said first and second mixing zones.

4. A method as defined in claim 3, wherein said final mixture is advanced in said second mixing zone at a different speed than in said third mixing zone.

5. An apparatus for producing a homogeneous mixture of granular and viscous substances, comprising, in combination, an elongated receptacle defining a mixing chamber having a preliminary and a main admixing zone; first admitting means for admitting part of a dry granular fraction into said preliminary admixing zone, and for admitting the remainder of said granular fraction into said main admixing zone; second admitting means for admitting a viscous fraction into said preliminary admixing zone; and combined admixing and advancing means operative for admixing said part of said granular fraction with said viscous fraction in said preliminary admixing zone to obtain a most granular intermediate mixture, and for advancing said intermediate mixture into said main admixing zone for effecting admixture in the latter of said remainder of said dry granular fraction with said intermediate mixture to thereby obtain a flowable dry granular final mixture.

6. An apparatus as defined in claim 5, said receptacle being elongated in horizontal direction and said mixing chamber being of cylindrical outline.

7. An apparatus as defined in claim 5, said receptacle having opposite ends and being provided at one end with inlet means and at the other end with outlet means respectively communicating with said mixing chamber, and wherein said inlet means comprises a first inlet communicating with said preliminary admixing zone for discharging a viscous fraction thereinto, and a second inlet for granular fraction and having two discharge apertures one of which communicates with said preliminary admixing zone and the other of which communicates with said main admixing zone; and further comprising distributing means associated with said second inlet and operative for distributing a granular fraction partly to said one and partly to said other of said discharge apertures.

8. An apparatus as defined in claim 7, said first inlet communicating with said preliminary mixing zone in a predetermined region thereof, and said one discharge aperture of said second inlet also communicating with said preliminary mixing zone in said predetermined region of the same.

9. An apparatus as defined in claim 8, said second inlet means including an opening in said vessel communicating with said preliminary mixing zone and a conduit communicating with said opening, and said distributing means being located in said conduit means and subdividing the interior of the latter into two channels each of which has a discharge aperture communicating with said mixing chamber.

10. An apparatus as defined in claim 9, said admixing and advancing means comprising an elongated shaft member extending longitudinally of said mixing chamber mounted for rotation therein, and a plurality of mixing and advancing members carried by and projecting radially from said shaft member.

11. An apparatus as defined in claim 10, said mixing and advancing members comprising blades having respective major surfaces inclined at predetermined angles with reference to the axis of said shaft member so as to effect advancing of the contents of said mixing chamber in response to rotation of said shaft member.

12. An apparatus as defined in claim 11, said blades being spaced from one another longitudinally of said shaft member; and wherein the spacing of said blades and/or the angles of inclination of said major surface differ in the different mixing zones.

13. An apparatus as defined in claim 12, wherein the spaces between adjacent ones of said blades are smaller in said preliminary mixing zones than in said main mixing zone.

14. An apparatus as defined in claim 12, wherein said distributing means comprises a distributing member having at least two mutually inclined outer surfaces respectively facing a side wall of said conduit means and diverging in direction away from one another and towards said opening in said vessel.

15. An apparatus as defined in claim 10, wherein at least said shaft member is coated with a synthetic plastic material.

16. An apparatus as defined in claim 7; and further comprising supply means communicating with said second inlet for supplying granular fraction thereto.

17. An apparatus as defined in claim 16, said supply means comprising vibratory supply channel means, and actuating means associated with said supply channel means and operative for vibrating the same at varying vibratory frequencies and/or vibratory amplitudes at the will of an operator.

18. An apparatus as defined in claim 7, said first inlet means comprising at least two individual first inlets each arranged for discharging into said preliminary mixing zone a substance having a viscosity different from that of the substance discharged by the other.

19. An apparatus as defined in claim 18, one of said first inlets being adapted for discharging an aqueous substance; and further comprising an atomizing nozzle associated with said one first inlet for atomizing the substance which is being discharged therefrom.

20. An apparatus as defined in claim 19, the other of said first inlets being adapted for discharging a substance of considerably higher viscosity than said aqueous substance; and wherein said other of said first inlets includes an inlet conduit, filter means including a sieve-type filter insert interposed in said inlet conduit, and a rotary pump associated with inlet conduit for advancing the substance of high viscosity therethrough, said pump having a rotor and a follower both of which consist of bronze.

21. An apparatus as defined in claim 20, wherein said filter means consists of bronze.

22. An apparatus as defined in claim 21; further comprising a ball valve and a volume counter interposed in said inlet conduit for regulating the quantities of viscous substance admitted through said inlet conduit.

23. An apparatus as defined in claim 5, said receptacle being configured as a substantially horizontally positioned cylindrical vessel and comprising end walls closing the opposite ends thereof; and wherein said vessel and said end walls consist of synthetic plastic material.

24. An apparatus as defined in claim 23, wherein said synthetic plastic material is polyvinylchloride.

25. An apparatus as defined in claim 5, said mixing chamber further having a final admixing zone located downstream of said main admixing zone and arranged to receive said final mixture therefrom so that the latter may be subjected to a final treatment in said final mixing zone.

26. An apparatus as defined in claim 25, said admixing and advancing means comprising an elongated rotatable shaft member extending through said admixing zones, and blades provided on and projecting radially from said shaft member; and further comprising a plurality of rotary separators located in said final admixing zone and respectively rotatable about axes of rotation normal to the axis of said shaft member for breaking up agglomerations which may have formed in said final mixture.

27. An apparatus as defined in claim 26, said rotary separators each including a cutter head comprising a plurality of cutting edges arranged in form of a crown and each extending in parallelism with the axis of rotation of the respective separator.

28. An apparatus as defined in claim 27, said rotary separators including at least two discrete separators each of which rotates in a direction opposite the direction of rotation of the other.

29. An apparatus as defined in claim 25, said mixing chamber having a predetermined length, and said preliminary and final admixing zones each having a length which is less than one-third of said predetermined length.

References Cited

UNITED STATES PATENTS

| | | | |
|---|---|---|---|
| 3,130,070 | 4/1964 | Potters | 259—9 X |
| 3,212,757 | 10/1965 | Martin | 259—4 |
| 3,346,240 | 10/1967 | Lavelle | 259—26 |
| 3,348,820 | 10/1967 | Wilkinson | 259—6 X |
| 3,430,929 | 3/1969 | Kawecki | 259—165 X |
| 3,459,409 | 8/1969 | Goldberger | 259—178 X |

ROBERT W. JENKINS, Primary Examiner

U.S. Cl. X.R.

259—25, 178